March 31, 1970 S. H. GARTMAN ET AL 3,504,374
MICROWAVE DEMONSTRATION SYSTEM

Filed Aug. 20, 1964 6 Sheets-Sheet 1

INVENTORS
STANLEY H. GARTMAN
EDWARD F. MEYERS
BY
MORGAN, FINNEGAN, DURHAM & PINE
ATTORNEYS

March 31, 1970    S. H. GARTMAN ET AL    3,504,374
MICROWAVE DEMONSTRATION SYSTEM
Filed Aug. 20, 1964    6 Sheets-Sheet 3

*INVENTORS*
STANLEY H. GARTMAN
EDWARD F. MEYERS
BY
MORGAN, FINNEGAN, DURHAM & PINE
ATTORNEYS

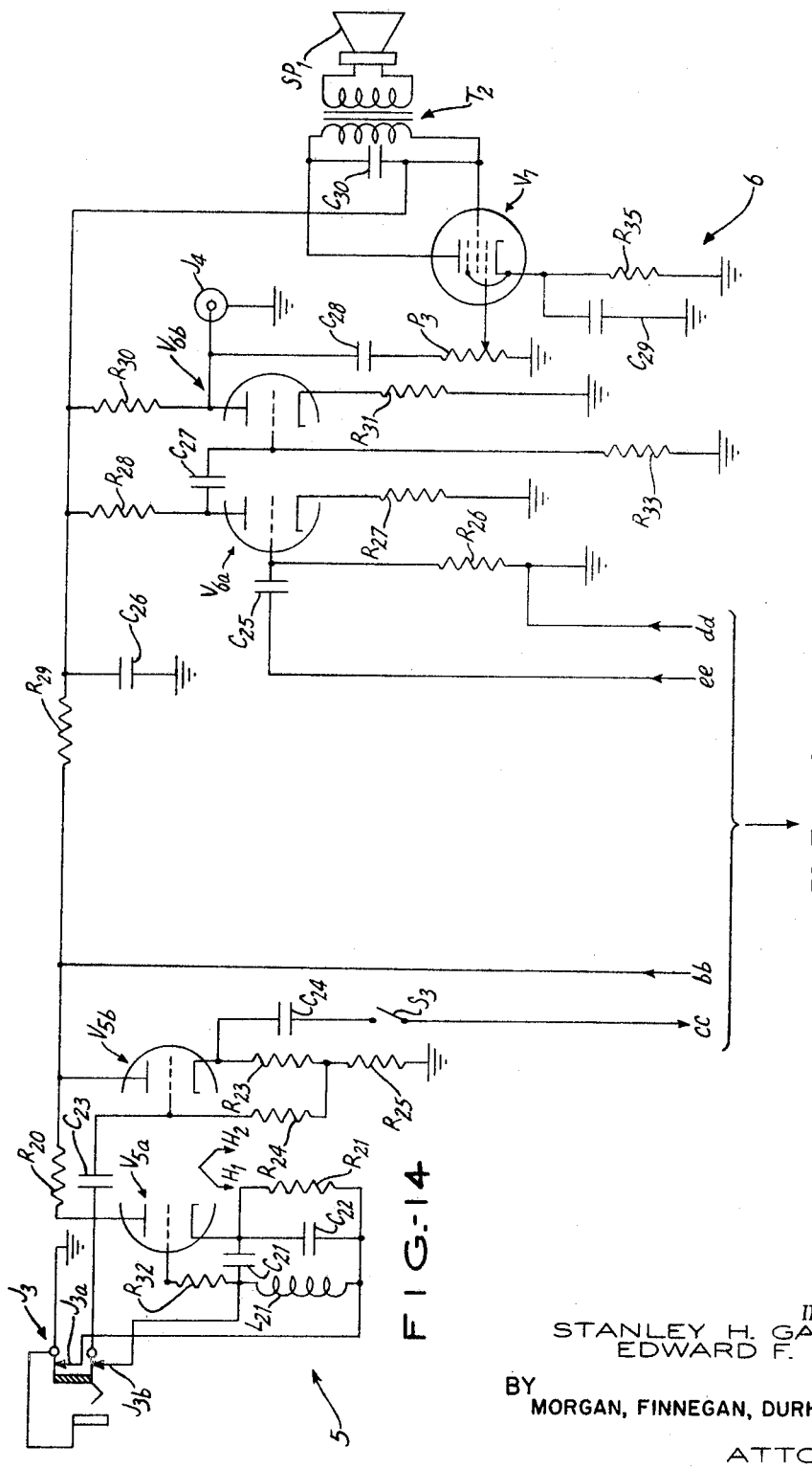

United States Patent Office 3,504,374
Patented Mar. 31, 1970

3,504,374
MICROWAVE DEMONSTRATION SYSTEM
Stanley H. Gartman and Edward F. Meyers, Roslyn Heights, N.Y., assignors to Sargent-Welch Scientific Company, a corporation of Illinois
Continuation-in-part of applications Ser. No. 177,833, and Ser. No. 177,888, Mar. 6, 1962. This application Aug. 20, 1964, Ser. No. 390,919
Int. Cl. G01r 27/04
U.S. Cl. 324—58                                                 1 Claim

ABSTRACT OF THE DISCLOSURE

A microwave demonstration system which includes a klystron, or equivalent microwave source, a waveguide and receiver. Various propagation altering means are adapted to be interposed between the microwave source and receiver for intercepting and altering microwave energy transmitted between the microwave source and receiver.

This invention relates to systems for observing optical phenomena and, more particularly, to self-contained systems for investigating, demonstrating, observing and evaluating optical phenomena in terms of the generation, propagation, control and reception of electromagnetic energy lying in the microwave region of the spectrum. This application is a continuation-in-part of applicants' prior copending applications, Ser. Nos. 177,883 and 177,888, both filed Mar. 6, 1962, for Microwave Accessory Equipment and Microwave System, respectively, and assigned to the assignee of the instant application and now abandoned.

Systems according to the invention are particularly adapted to serve as teaching aids and it has been found that the utilization of microwave components is particularly effective in developing an understanding of the broader optical principles applicable to electromagnetic energy in general.

It is thus an object of the invention to provide improved systems for observing optical phenomena.

A still further object of the invention is to provide complete self-contained microwave systems which provide clear and effective demonstration of basic principles of optics, which are versatile and comprehensive thereby providing maximum utilization as a teaching aid and, at the same time, are sufficiently inexpensive to be within the means of most potential users.

It is a further object of the invention to eliminate the redundancy and inefficiency heretofore characterizing microwave control equipment and to provide instead a single, integrated, and unitary accessory capable of energizing a microwave system, controlling the frequency and other parameters thereof, and indicating various conditions and effects therein notwithstanding these several functions ordinarily require separate and different circuit configurations.

Still further objects of the invention are to provide simple means for energizing, monitoring and controlling microwave equipment and to provide integrated electronic apparatus for controlling the power, modulation and monitoring of microwave systems with equipment which is inexpensive, portable, and capable of controlling and clearly indicating a plurality of conditions in said microwave system for such purposes as testing, adjustment, demonstration, fault-finding and experimentation.

These and other objects and advantages of the invention will be set forth in part hereinafter and, in part, will be obvious herefrom, or may be learned by practise with the invention, the same being realized and attained by means of the instrumentalities and combinations pointed out in the appended claim.

The invention consists in the novel parts, constructions, arrangements, combinations and improvements herein shown and described.

Serving to illustrate exemplary embodiments of the invention are the drawings, of which:

FIGURE 14 is a schematic diagram of a second section of the accessory unit interconnected with the section of FIGURE 13 and embodying certain modulation and additional monitoring stages.

Figure 1:
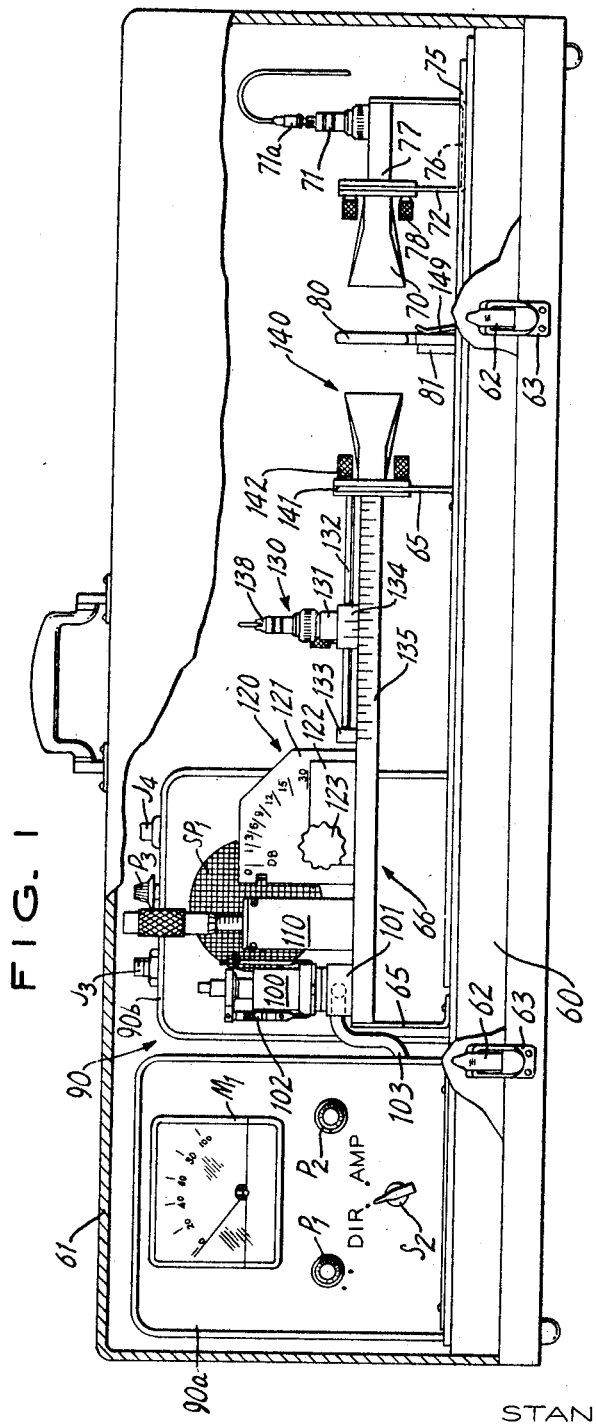
FIGURE 1 is an elevational view of one system of the invention, including the chassis and cover therefor.

As seen in FIGURE 1, one system according to the invention is conveniently installed on a chassis 60 which is adapted to receive a cover assembly 61 for housing the system. Latches 62 on cover 61 cooperate with hooks 63 on chassis 60 to facilitate the packaging and transportation of the system. Typical overall dimensions are approximately 30" x 10" x 8" while total weight is about 40 lbs.

Mounted on base 60 with the aid of supporting members 65 is a transmission line comprising a waveguide 66 to which various system components are coupled. The waveguide and these components generally encompass the transmitting section of the system.

A receiver section, comprising pick-up means, preferably in the form of a horn antenna 70, and detecting means 71 coupled thereto, are installed on a support 72, movable with respect to the chassis 60. The receiver location may thus be varied with respect to the transmitter position.

Adapted to be interposed between the transmitter and receiver are propagation altering means such as a polarizer 80, which is releasably clamped in a movable support 81. Since the receiver section and propagation altering means are both movable, system geometry may be adjusted to any desired configuration to demonstrate and examine various effects which depend upon special orientation of the system components. Control over this orientation is provided in part by a base scale 75 on chassis 60 and a cooperating vernier scale 76 mounted on the support 72 of receiver section 70, 71.

For supplying power and monitoring the transmitter and receiver, the invention provides an accessory section 90 which is illustratively housed in two units 90a and 90b installed on chassis 60 adjacent the transmitter section. Monitored signals may be shown on meter $M_1$ of unit 90a and/or heard on speaker $SP_1$ of unit 90b. Units 90a and 90b may alternatively be combined in a single housing.

TRANSMITTER SECTION

Turning now to the transmitter, it may be seen that this section comprises, in addition to transmission line 66, a source of microwave power, preferably in the form of klystron 100 coupled to one end of waveguide 66. A tunable power absorption device, embodied in the form of a tunable cavity 110 is also coupled to the wave guide at a subsequent point in the propagation patch. The cavity is adapted to function as a frequency determining element in combination with other system components. Loss insertion means 120 which include means for adjustably inserting a modifying element 122 into the interior of the waveguide are also provided in the transmitter section adjacent tunable cavity 110. Movable waveguide detector means 130, and radiator means 140, preferably in the form of a horn radiator, from the terminal end of the transmitter.

The klystron 100 is conveniently of the reflex type and may comprise, for example 2K25. It is mounted in a socket 101 secured to waveguide 66 in such a manner that the output probe of klystron (not shown) extends into the interior of the guide.

The klystron includes turning bow 102 and is supplied with operating potentials from the accessory section 90. Adjustment of the klystron to operate in any particular mode is acomplished by adjustment of tuning bow 102 and the repeller plate voltage, the amplitude of which is adjusted by a control $P_1$ in the accessory unit 90a. Energizing, control and modulating potentials are routed to the klystron socket 101 and at the other end to the accessory unit 90a.

Figure 2:
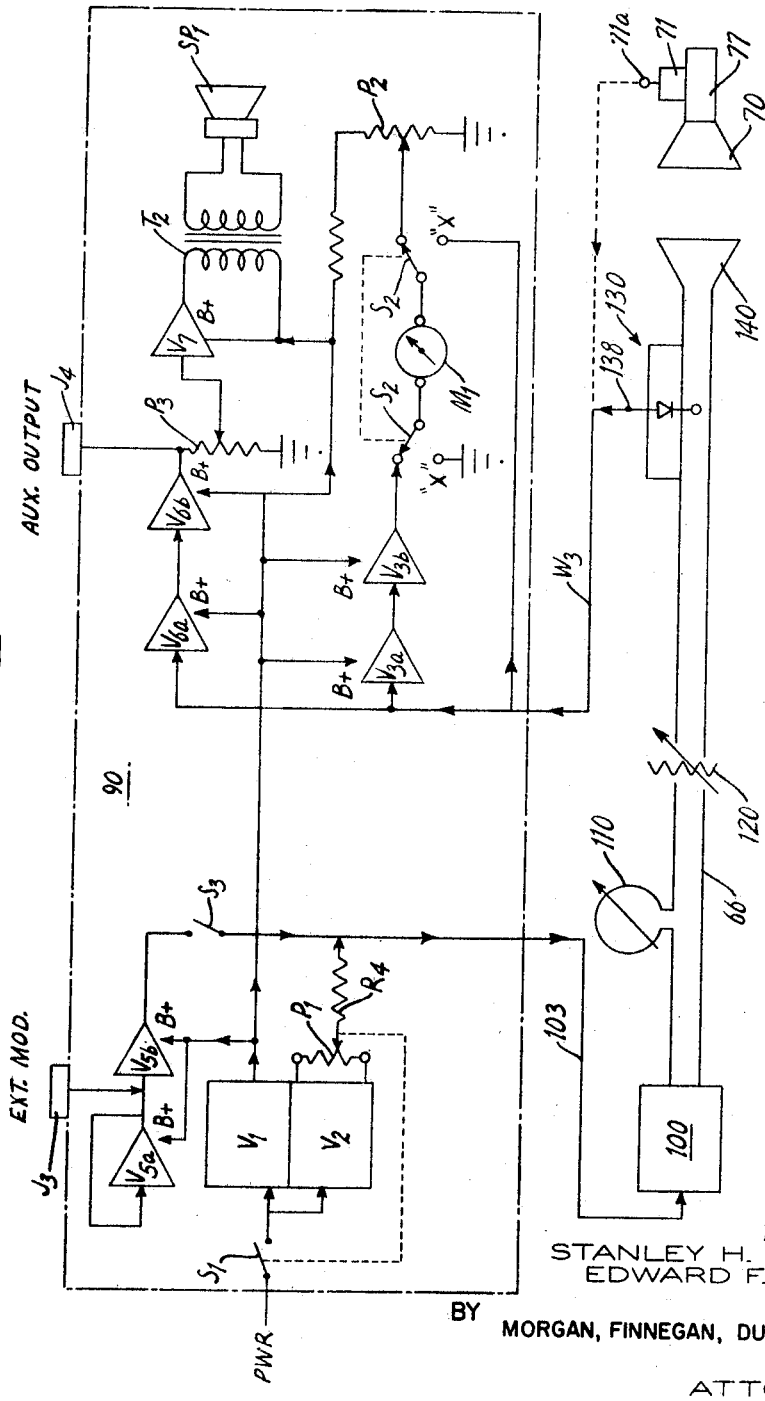
FIGURE 2 is a schematic diagram of the system of FIGURE 1 illustrating a system data flow.
Figure 13:
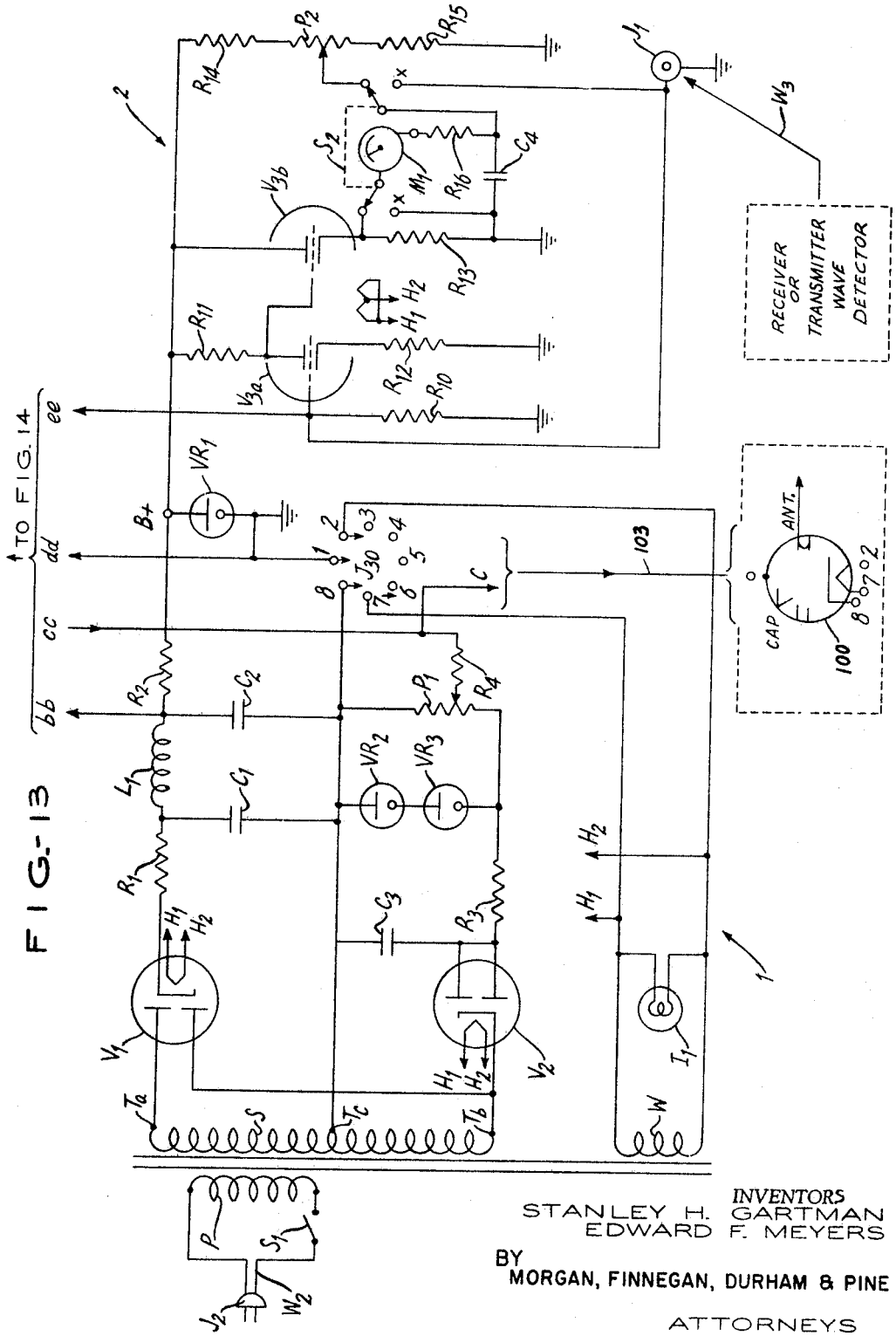
FIGURE 13 is a schematic diagram of one section of the electronic accessory unit of FIGURE 1 embodying certain power and monitoring stages.

Derivation of these klystron potentials may be seen by reference to FIGURES 2, 13 and 14 which illustrate the arrangement and interconnection of components in the electronic section 90.

As seen in FIGURE 2, power (e.g. 115 volts/60 c.p.s.) is applied to rectifier circuits $V_1$ and $V_2$ by way of a switch $S_1$ which is mechanically ganged to the control $P_1$ (FIGURES 1, 2). Rectifier circuit $V_2$ develops a rectified and filtered DC voltage which appears across potentiometer $P_1$. Adjustment of the latter selects the desired voltage within the range provided by $V_2$ for application to the repeller plate of klystron 100 via resistor $R_4$ and a lead in cable 103. Rectifier circuit $V_2$ also supplies filament voltages and a ground connection for the klystron.

Electronic section 90 also includes modulating means comprising an oscillator $V_{5a}$ which in the illustrated embodiment generates a 1000 cycle audio note which is fed to the repeller plate of klystron 100 via a cathode follower $V_{5b}$. The klystron may thus be subjected to a form of frequency modulation by the generated audio signal.

If another form of modulation is desired an appropriate signal may be inserted into the modulation section via connector $J_3$ (see also FIGURE 1). This connector is preferably arranged so that insertion of a plug therein automatically disables oscillator $V_{5a}$ and connects the external input to cathode folower $V_{5b}$ for ultimate modulation of the microwave oscillator.

Plate potentials for the modulation stages are derived from full wave rectifier circuit $V_1$ energized from a transformer which is common to the rectifier circuit $V_2$. Rectifiers $V_1$ and $V_2$ are housed in unit 90a while the modulator section is housed in accessory unit 90b. Both are described in greater detail hereinafter.

Figure 3:
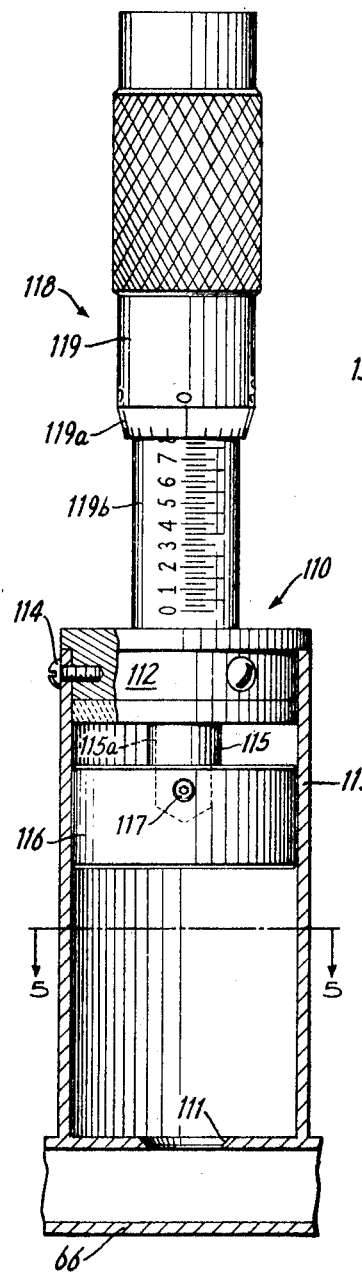
FIGURE 3 is an elevational fragmentary view, partly in section, and on an enlarged scale, of tunable power-absorbing and frequency indicating means coupled to the waveguide means of the system of FIGURE 1.
Figure 5:
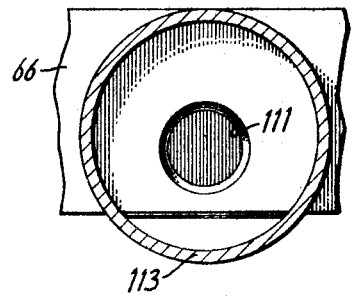
FIGURE 5 is a view taken along the lines 5—5 of FIGURE 3.

When klystron 100 is energized as described above the output thereof is fed into waveguide 66 and is propagated towards radiator 140 (FIGURE 1). Adjacent the klystron in this propagation path is the tunable absorption cavity 110, the details of which may be noted by reference to FIGURES 3 and 5.

As seen in these figures the tunable cavity is mounted on waveguide 66 and communicatees therewith through an aperture 111. The cavity is of generally cylindrical shape and is capped by end plate 112 secured to the cavity walls 113 as by screws 114. Cap 112 plate includes a bore for receiving a sleeve 115 and movable coaxial shaft 115a. Secured to the shaft 115a as by a set screw 117, is a plunger 116 which forms the upper wall of the active cavity and is adjustable with respect to the base of the cavity by means of a micrometer movement 118. The latter displaces shaft 115a and member 116 axially of the cavity in response to rotation of the micrometer barrel 119. The barrel includes a scale 199 while the outer housing of shaft 155a is provided with a scale 119b. The scale reading provides a measure of cavity dimension and is thus indicative of the resonant frequency of the cavity. This frequency may be correlated to the scale reading by a suitable table or graph or may be directly indicated by the scales.

Adjacent the tunable cavity in the direction of propagation are transmitter output control means embodied as a variable flap attenuator 120 (FIGURES 1, 2). The attenuator includes an upstanding scale 121 secured to waveguide 66 and a dissipative flap member 122 rotatably coupled to scale 121 and operated by a control 123. Directly beneath the flap 122 in alignment therewith is a slot in waveguide 66. This slot extends beyond the flap in the direction of propagation and continues up to a point in proximity with the terminal of the guide. As control 123 is rotated clockwise the dissipative flap 122 is displaced through the waveguide slot into the guide interior. The resultant power attenuation, being a function of the depth of penetration, is indicated on the scale 121 in decibels.

Adjacent the attenuator 120 in the direction of propagation are movable detector means 130 including a carriage 131 which is slidably mounted on a pair of spaced, parallel guide rails 132 and including a connector 138. The rails 132 are each secured at one end to the terminal flange of guide 66 and at their opposite end to an intermediate flange 133 fixed to the guide. The position of carriage 131 with respect to the guide is determinable by reference to a scale 134 provided on the carriage and a scale 135 provided on the side of the waveguide.

Figure 4:
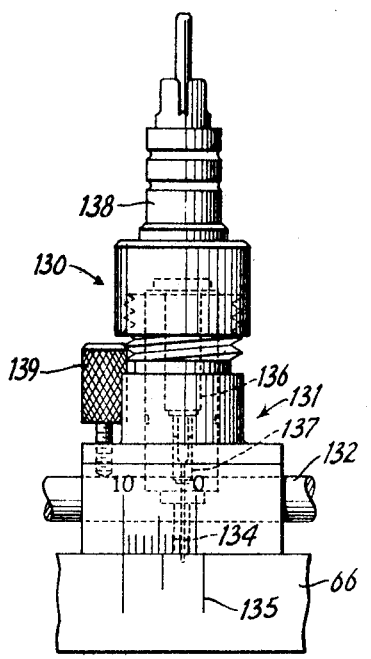
FIGURE 4 is an elevational fragmentary view on an enlarged scale, of movable waveguide-mounted detecting means for use with the system of FIGURE 2.

Additional details of the detector are illustrated in FIGURE 4. As seen therein, there is housed within the carriage 131, a crystal diode 136, and a probe assembly 137 to which the crystal is releasably clamped. Probe 137 extends through a bore in the center of the carriage and communicates with the interior of waveguide 66 via the slot therein. The other end of crystal 136 is in electrical contact with the connector 138 which is screwed on the upper threaded portion of the carriage. For releasably locking the carriage in fixed position with respect to the waveguide, a thumb screw 139 is provided, the threaded end of which engages one of the rails 132 to hold the carriage in position. While not shown, the carriage assembly also includes insulated sleeves and shielding members which are customary in mounting crystals in waveguide assemblies.

The output end of waveguide 66 and the support 65 therefor are adapted to receive the horn 140 which has a flange 141 fitted to the end flange of guide 66 and secured thereto as by thumb screws 142. Other waveguide elements may be substituted for horn 140 as described more fully hereinafter.

RECEIVER SECTION

The receiver section of the system comprises pick-up means, illustratively a horn 70 which is secured to the flange of a rectangular waveguide section 77 as by thumb screws 78. This interconnected combination is supported slidably on chassis 60 by a generally U-shaped base member 72 having the previously mentioned scale 76 mounted on the bridge section thereof.

Figure 6:
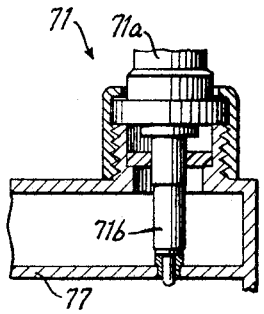
FIGURE 6 is an elevational fragmentary view in section and on an enlarged scale, of a portion of the receiver detecting means.

Mounted towards the rear of waveguide 77 and communicating with the interior thereof is the detector 71 comprising a connector 71a which communicates with a crystal 71b (FIGURE 6) disposed within waveguide 77 (FIGURE 6). The signal picked up by receiver horn 70 and detected by crystal 71b may be transmitted to the electronic accessory section 90 via a cable. Alternatively this cable or another, may be connected to the sliding detector 130 mounted on waveguide 66 for coupling to electronic section 90. In either event, the signal selected is routed to the electronic section, and treated as described below.

As illustrated in FIGURE 2 the detected signal selected at terminal 71a in the receiver or terminal 138 in the transmitter, is applied to the input of monitor means comprising an amplifier section $V_{3a}$, $V_{3b}$, $V_{6a}$, $V_{6b}$, and $V_7$ and indicators $M_1$, $SP_1$. The monitor section also includes switch $S_2$ mounted on unit 90a as seen in FIGURE 1; the input signal is also connected to this switch.

Routing of the detected signal depends in part on the position of switch $S_2$. In the position shown in FIGURE 2, the detected signal is amplified in stage $V_{3a}$ and coupled to meter $M_1$ for display thereon via cathode follower $V_{3b}$ and switch contacts of $S_2$. For balancing of meter $M_1$, a potentiometer $P_2$, mounted on unit 90a, FIGURE 1, is provided which is energized from the B+ supply developed by rectifier $V_1$. The meter $M_1$ in this mode of operation provides a measure of the DC component of the detected signal.

AC components are coupled to and amplified by preamplifiers $V_{6a}$ and $V_{6b}$. The output of the latter is developed across a volume control potentiometer $P_3$ mounted on unit 90b, FIGURE 1. At this point in the circuit, connection may be made by way of output connection $J_4$ (see also FIGURE 1) to a remote indicator such as an oscilloscope.

A desired fraction of the signal developed across $P_3$ is fed in accordance with the setting of that control to power amplifier $V_7$ the output of which drives loudspeaker $SP_1$ via output transformer $T_2$. Thus audio components of the detected signal are monitored on speaker $SP_1$ and variations in the signal will be reflected in corresponding variations in the volume of sound issuing therefrom.

Where amplification of the direct current component is not required, switch $S_2$ may be moved to a second position "X" ("DIR," FIG. 1) in which event the amplifier-follower $V_{3a}$, $V_{3b}$ is bypassed and meter $M_1$ directly energized.

The above-described DC circuits are housed in section 90a while the AC components are mounted in unit 90b. Both sections receive energizing potentials from rectifier $V_1$.

PROPAGATION ALTERING ELEMENTS

Figure 7A:
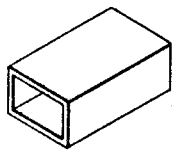
FIGURES 7A, 7B, 7C and 7D are perspective views illustrating several waveguide sections for use in the system of FIGURE 1.
Figure 7B:
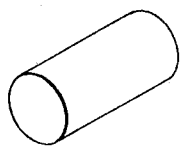
Figure 7C:
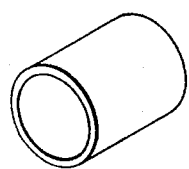

The system of FIGURE 1 includes various microwave components adapted to vary system conditions. There are accordingly provided various waveguide elements including a rectangular waveguide, FIGURE 7A, a dielectric waveguide, FIGURE 7B and a circular waveguide, FIGURE 7C. Other waveguide elements of similar configuration but different dimensions may also be advantageously provided. The illustrated guides are adapted for insertion between the transmitting antenna 140 and receiver antenna 70 and serve to demonstrate certain microwave properties as referred to hereinafter.

Figure 7D:
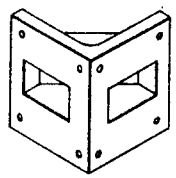

In addition to the foregoing, an H-bend waveguide section is also included, FIGURE 7D, this guide being adapted to be interposed between the transmitting horn 140 and the terminal flange of waveguide 66.

Figure 12:
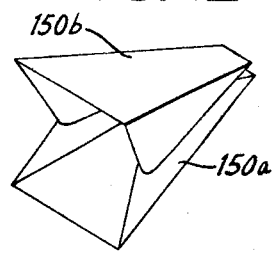

In certain applications the system according to the invention employs a horn of higher gain than that shown in FIGURE 1. Such a horn, illustrated in FIGURE 12, is adapted to be releasably superimposed over horn 140 or horn 70. The high gain horn comprises two pivotally interconnected sections 150a and 150b which are resiliently urged into the position shown in FIGURE 12 but may be expanded by pressure on the larger end to permit installation of the horn over horn 140 or horn 70.

Figure 11:
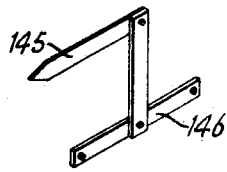

For the investigation of certain attenuation and phase shifting phenomena, the system also includes an attenuator and phase shifter illustrated in FIGURE 11. This member is adapted for insertion into the slot in waveguide 66 for introducing phase shift.

Figure 8:
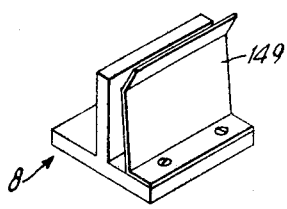
FIGURE 8 is a perspective view of a support employed in the system for releasably holding certain microwave elements in desired position.
Figure 9:
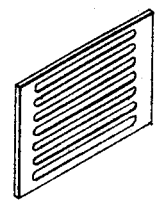
FIGURES 9 through 12 are perspective views of a polarizing grid, a refractory block, an attenuator/phase shifter, and a high gain type microwave horn, respectively, all of which components are designed for use in the system in making certain observations, demonstrations and tests.
Figure 10:
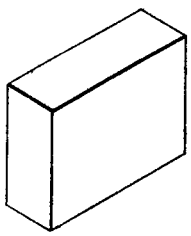

For introducing certain effects in the propagation path between the transmitter and receiver, there is also provided the stand 81 (see FIGURE 1) having a resilient clamp 1749 (FIGURE 8) secured thereto. This stand is adapted to releasably support various elements such as the previously mentioned polarizing grid 80 illustrated in FIGURES 1 and 9. Other accessories provided with the system for interposition between the transmitter and receiver include a block of plastic refraction material, FIGURE 10, and a reflector such as a mirror, not shown.

ELECTRONICS SECTION-TRANSMITTER

A specific form of the electronic accessory equipment 90a, 90b is shown in FIGURES 13 and 14. As embodied, the power supply section thereof comprises a transformer having a primary P energized from the available AC source, e.g., 115 v./60 c.p.s., via a connector $J_2$, cable $W_2$, and the switch $S_1$. Coupled to the secondary winding S of the transformer are the rectifier circuits, while an additional secondary winding W serves as a filament source. Connected across winding W is an indicator lamp $I_1$ which is conveniently mounted to illuminate the meter $M_1$.

One of the rectifier circuits, of full-wave configuration, comprises the dual rectifier tube $V_1$, the plates of which are connected respectively to the terminals $T_a$ and $T_b$ of secondary S. The cathode of $V_1$ connects to filtering means, illustratively a pi filter $C_1$, $L_1$, $C_2$, via limiting resistor $R_1$. The pi filter is returned to the tap, $T_c$, on winding S, while its output is connected to regulator means, e.g., gas tube $VR_1$, via resistor $R_2$.

The additional rectifier circuit of half-wave configuration, comprises rectifier tube $V_2$ having a cathode connected to terminal $T_b$ and a pair of interconnected plates connected to filtering means including a filter capacitor $C_3$ and resistor $R_3$. The other side of $R_3$ connects to regulating means comprising a pair of serially connected gas diodes, $VR_2$ and $VR_3$. The diodes and capacitor $C_3$ are returned to tap $T_c$ on winding S.

Connected across the regulators $VR_2$, $VR_3$ is the potentiometer $P_1$ for controlling the repeller plate potential of the klystron 100 (see also FIGS. 1, 2). The arm of $P_1$ is connected to an output lead C of the cable 103 via the resistor $R_4$. Cable 103 also connects to klystron connector $J_{30}$; terminal 1 thereof is grounded while terminal 8 is connected to center tap, $T_c$. Terminals 2 and 7 are connected to the filament voltage source winding W.

The outputs routed through 103 supply the energizing and control potentials for the klystron 100 as noted previously. Thus, lead C is connected to the repeller plate cap; terminal 1 of 103 is connected to the envelope; terminals 2 and 7 to the filament and terminal 8 to the cathode.

A specific form of the modulating means for modulating the microwave source is illustrated in FIGURE 14.

As generally indicated at 5 in FIGURE 14, the modulation circuit oscillator $V_{5a}$ comprises a colpitts oscillator while stage $V_{5b}$ is embodied as a triode cathode follower.

Triode $V_{5a}$ has a plate connected to the B supply via $R_{20}$ and lead bb (see FIGURE 13), a cathode connected to the intermediate terminal of a capacitive divider $C_{21}$, $C_{22}$ and a grid connected via resistor $R_{32}$ to the junction of this divider and inductor $L_{21}$. The inductor and capacitive divider form a parallel tuned circuit which is returned to ground via contact $J_{3a}$ of the external modulation jack $J_3$. The tuned circuit is shunted by a resistor $R_{21}$ and the output terminal thereof is connected via contact $J_{3b}$ and a capacitor $C_{23}$, to the grid of the cathode follower $V_{5b}$.

The plate of $V_{5b}$ connects to the B supply via lead $bb$ while the cathode is connected to ground through series resistors $R_{23}$ and $R_{25}$; the grid is connected to the junction of these resistors via a resistor $R_{24}$.

The output of the cathode follower $V_{5b}$ is fed via a coupling capacitor $C_{24}$, the switch $S_3$ and lead $cc$ to output lead C (FIGURE 13) and thus provides repeller plate modulation. This modulation potential preferably lies in the audio range and is typically applied to the repeller of the klystron to provide a form of frequency modulation.

Modulation stage 5 is automatically transferable to serve as means for coupling an external source of modulation to the microwave source. Such external modulation can include another oscillator of different frequency and/or waveform, or a source of voice or music. The transfer is effected by connecting the externally derived signal to jack $J_3$ whereby the oscillator is disabled and the external input fed to the grid of $V_{5b}$ for impedance change and ultimate coupling to the klystron via leads $cc$ and C.

ELECTRONICS SECTION-MONITORING

Specific embodiments of the previously described monitor are also illustrated in FIGURES 13 and 14.

Referring to FIGURE 13, the DC amplifier $V_{3a}$, $V_{3b}$ receives an input signal via the jack $J_1$ of cable $W_3$ which is adapted for connection to the output 138 (FIGURE 2) of standing wave detector 130 or output terminal 71a of the receiver 70, 77. The selected signal is applied to the grid of amplifier stage $V_{3a}$ and the grid is returned to ground via a resistor $R_{10}$. The plate of $V_{3a}$ is connected via resistor $R_{11}$ to the regulated output of the rectifier circuit described hereinbefore, while the cathode is connected to ground through resistor $R_{12}$. The output of tube $V_{3a}$ is taken from the plate thereof by way of direct connection to the grid of a second triode, $V_{3b}$. The plate of the latter is connected to the regulated supply while the cathode is connected to ground through resistor $R_{13}$.

$V_{3b}$ is in cathode follower configuration for impedance transformation; the output thereof is taken from the cathode and connected via switch $S_2$ to meter $M_1$. The other side of $M_1$ is connected via $R_{16}$ through a contact of $S_2$ to the balancing potentiometer $P_2$ of the balancing branch which is energized from the regulated B supply. The branch includes resistances $R_{14}$ and $R_{15}$ serially connected to $P_2$. It may be seen that the above branch together with the meter $M_1$ and tube $V_{3b}$ define a bridge circuit for energizing the meter. Capacitor $C_4$ decouples AC components from the meter.

Where amplification is not required and as noted hereinbefore switch $S_2$ may be placed in the "X" position whereby the input signal directly energizes the meter via series resistor $R_{16}$ to indicate the signal amplitude. Thus the meter may be energized directly or via the amplifying system.

Signals including an audio component are monitored by aural indication and when applied to jack $J_1$, are coupled via lead $ee$ of FIGURE 13 to the audio monitor shown in FIGURE 14 and having preamplifier section $V_{6a}$, $V_{6b}$ and power amplifier $V_7$. This audio signal coupling is completed to the grid of stage $V_{6a}$ via capacitor $C_{25}$ and grid return $R_{26}$. The plate of $V_{6a}$ is connected to the B supply by ways of resistor $R_{28}$, decoupling capacitor $C_{26}$, resistor $R_{29}$ and lead $bb$. The cathode connects to ground through a stabilizing resistor $R_{27}$.

The amplified output is coupled to the grid of second cascaded preamplifier stage $V_{6b}$ via coupling $C_{27}$ and grid return $R_{33}$. The plate of $V_{6b}$ is energized from the B supply via a resistor $R_{30}$ and the same connections just described with respect to $V_{6a}$. The cathode of $V_{6b}$ is connected to ground through stabilizing resistor $R_{31}$ and the signal output is taken from the plate and dropped across the series combination of $C_{28}$ and volume control potentiometer $P_3$. This output is conveniently made accessible to external indicators such as an oscilloscope by way of jack $J_4$ connected to the plate $V_{6b}$.

The output is also applied in accordance with the setting of $P_3$ to the grid of power amplifier $V_7$. The cathode thereof is connected to ground via resistor $R_{35}$ and decoupling capacitor $C_{29}$ while the plate is connected to the screen through the primary of an output transformer $T_2$. A capacitor $C_{30}$ shunts the primary while the speaker $SP_1$, serving as the aural indicator, is energized by the secondary. The B supply connection is made to the screen via $R_{29}$. Any audio component of the initial input signal, if properly detected, is heard on speaker $SP_1$ which is especially useful for group observation. This signal may be for example, the note generated by modulator 5 and applied to the klystron oscillator. It may appear in other sections of the system and after slope or FM detection and application to the audio monitor, will be heard on the speaker.

OPERATION

In operation the system is energized by actuation of control $P_1$ which closes $S_1$ (FIGURES 1, 2) to energizing rectifiers $V_1$ and $V_2$ with a resultant application of operating potential to the microwave source 100. If modulation is desired switch $S_3$, FIGURE 2, is actuated.

The source 100 is adjusted by $P_1$ and the tuning bow 102 and these may be set to obtain a desired operating frequency and mode, by observing the output of detector 71 as displayed on meter $M_1$ with the tunable cavity set at the desired frequency. The modulation function and the audio monitor including speaker $SP_1$ may be employed as an alternate or adjunct in this procedure.

There are an almost limitless number of tests, demonstrations and experiments which may be performed with the system. The effects of receiver horn orientation are readily determined by monitoring the output of detector 71 while the receiver position is varied. Attenuation as a function of propagation path length is seen by changing the separation between transmitter and receiver; radiation pattern can be measured and reflection effects observed. The latter can include investigation of the reflecting properties of various materials with the receiver horn 70 positioned to view the source image. Laws of reflection can be verified in this general arrangement and the effects of refraction (e.g. with the refractor of FIG. 10) and the underlying principles thereof seen and understood.

With the aid of sliding detector 130, standing waves in the guide may be detected and wavelengths in the guide and space measured with the output taken from 130 and, in the latter wavelength measurement, with the receiver serving as a movable reflector. Detector 130 and the phase shifter of FIGURE 11 enable investigation of phase shift and related phenomena. In all of these procedures attenuator 120 may be adjusted to meet the capabilities of the monitoring indicators.

Various absorption devices may be interposed between the transmitter and receiver (e.g. wet and dry sponge, grids, glass with and without water) to investigate absorption and reflection phenomena. Similar interposition of polarizer 80 (FIGURES 1, 9) and each of the various waveguide sections, FIGURES 7A, 7B and 7C, yields effects related to polarization and waveguide cut-off.

Suitably slotted elements and thin films can also be interposed to demonstrate interference and diffraction.

The effects of waveguide bends, FIGURE 7D, and radiators of different gain and directivity (FIGURE 12) are also readily observed.

What is claimed is:

1. A portable microwave demonstration system including a microwave source, a slotted waveguide connected to said source and having an antenna coupled to one end, a tunable power absorbing member connected to said waveguide between said source and said antenna, an attenuator adapted to be adjustably inserted in said waveguide between said source and said antenna through said slot, a slidable detector coupled to the interior of said waveguide between said source and said antenna, portable receiver means adapted to be spaced from said antenna in any one of a plurality of positions, portable propagation altering means adapted to intercept and alter microwave propagation from said antenna to said receiver means, and monitor means alternately responsive to the output of said receiver means and said detector, said receiver means including a horn antenna, a waveguide connected thereto, and a crystal detector coupled to said waveguide, said transmission antenna comprising a horn, and in which there is included horn modifying means adapted to be releasably mounted on said transmission horn and said receiver horn for varying the propagation characteristics thereof.

References Cited

UNITED STATES PATENTS

| | | | |
|---|---|---|---|
| 2,810,891 | 10/1957 | Englemann. | |
| 1,938,066 | 12/1933 | Darbord | 333—98 XR |
| 2,413,389 | 12/1946 | Smith | 324—123 XR |
| 2,482,173 | 9/1949 | Hagstrom | 324—58 |
| 2,494,568 | 1/1950 | Lundy | 331—84 XR |
| 2,517,589 | 8/1950 | Muller | 324—58 |
| 2,611,804 | 9/1952 | Zaleski | 324—58.5 |
| 2,797,388 | 6/1957 | Maybury | 324—58.5 |
| 2,813,251 | 11/1957 | Brown et al. | 324—58 XR |
| 2,822,465 | 2/1958 | Fraser | 324—58 XR |
| 2,844,789 | 7/1958 | Allen. | |
| 2,847,570 | 8/1958 | Brown et al. | 324—57 |
| 3,133,246 | 5/1965 | Jaffee et al. | 324—58.5 |

OTHER REFERENCES

Radar Electronics Fundamentals, Navships 900,016 pp. 95 and 101 (herein called Radar Fundamentals) 1944.

The Science Teacher, vol. 28, December 1961, 1961 p. 72.

IEE Proceedings Part B, vol. 106 (1959), pp. 150–155. (Excerpt from article by A. F. Harvey.)

Bell System Technical Journal, vol. 15, pp. 300–309 (1936), vol. 25, pp. 439, 446, 460 and 473–475.

Bell Laboratory Records, vol. 18 (1940), pp. 194–198.

RUDOLPH V. ROLINEC, Primary Examiner

P. F. WILLE, Assistant Examiner

U.S. Cl. X.R.

331—84

UNITED STATES PATENT OFFICE
CERTIFICATE OF CORRECTION

Patent No. 3,504,374  Dated March 31, 1970

Inventor(s) Stanley H. Gartman and Edward F. Meyers

It is certified that error appears in the above-identified patent and that said Letters Patent are hereby corrected as shown below:

Column 3, line 25, change "from" to --form--
Column 3, line 28, after "example" insert --a--
Column 3, line 32, "turning" should be --tuning--
Column 3, line 38, after "routed" insert --to the klystron 100 by a cable 103 which connects at one end--
Column 3, line 67, "folower" should be --follower--
Column 4, line 8, "communicatees" should be --communicates--
Column 4, line 11, delete "plate"
Column 6, line 18, "1749" should be --149--
Column 7, line 38, "reeciver" should be --receiver--
Column 10, line 20, after "439" insert --440--

SIGNED AND SEALED
AUG 11 1970

(SEAL)
Attest:

Edward M. Fletcher, Jr.
Attesting Officer

WILLIAM E. SCHUYLER, JR.
Commissioner of Patents